(12) United States Patent
Goyal et al.

(10) Patent No.: US 7,958,022 B2
(45) Date of Patent: Jun. 7, 2011

(54) PRE-PAY COMMUNICATION SERVICES

(75) Inventors: Apurva Goyal, Bangalore (IN); Badrinarayan Ravichandran, Bangalore (IN); Muralidhar Srinivasa Rao, Bangalore (IN); Padma Voothani, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 12/140,287

(22) Filed: Jun. 17, 2008

(65) Prior Publication Data

US 2009/0276342 A1    Nov. 5, 2009

(30) Foreign Application Priority Data

May 5, 2008 (IN) .............................. 1107/CHE/2008

(51) Int. Cl.
*G07B 17/00* (2006.01)

(52) U.S. Cl. ............... 705/30; 705/14; 705/400; 705/1; 705/38; 379/114.2; 235/380; 455/405

(58) Field of Classification Search ............... 705/30, 705/14, 400, 1, 38, 44; 379/114.2; 235/380; 455/405

See application file for complete search history.

(56) References Cited

U.S. PATENT DOCUMENTS

| | | | |
|---|---|---|---|
| 5,883,810 A * | 3/1999 | Franklin et al. ............... 700/232 |
| 6,950,506 B2 * | 9/2005 | Ruckart et al. ............. 379/114.2 |
| 2003/0004828 A1 * | 1/2003 | Epstein ........................... 705/26 |
| 2005/0251413 A1 * | 11/2005 | Ruckart et al. ..................... 705/1 |
| 2006/0173784 A1 * | 8/2006 | Marples et al. ................. 705/52 |
| 2006/0219775 A1 * | 10/2006 | Truitt et al. .................... 235/380 |
| 2008/0119162 A1 * | 5/2008 | Sivalingam et al. .......... 455/408 |
| 2009/0172402 A1 * | 7/2009 | Tran ................................ 713/170 |
| 2009/0227229 A1 * | 9/2009 | Waller .......................... 455/406 |

* cited by examiner

*Primary Examiner* — Vanel Frenel (57) ABSTRACT

A method and system for crediting a user account of a pre-pay communication service is presented. The method comprises the steps of: providing a shared credit resource to which a plurality of users of the pre-pay communication service are authorized access and to which at least one user contributes credit; and transferring credit from the shared credit resource to the user account, thereby enabling the user associated with the user account to use the pre-pay service.

15 Claims, 7 Drawing Sheets

PRE-PAY COMMUNICATION SERVICES

RELATED APPLICATIONS

Benefit is claimed under 35 U.S.C. 119(a)-(d) to Foreign application Serial No. 1107/CHE/2008 entitled "PRE-PAY COMMUNICATION SERVICES" by Hewlett-Packard Development Company, L.P., filed on 5 May, 2008, which is herein incorporated in its entirety by reference for all purposes.

BACKGROUND

The concept of pre-pay billing for the provision of services is well known, particularly in the field of mobile communications. For example, wireless communication network operators implement pre-pay billing systems in which a user of the network has an associated account into which credit must be deposited prior to making use of services provided by the network. A user is typically required to have a sufficient value of credit in the associated account in order to make use of the available network service(s). Thus, if an insufficient value of credit (for example, zero) is available in the associated account, the user is unable to use the network service(s) and must increase the value of credit in the account before the service(s) can be used.

A common way to increase the value of credit in an account is to purchase a voucher in exchange for money. The voucher provides information which the user can then register with the network operator. Based on the information provided, the network operator increases the value of credit in the user's associated account. Thus, in certain situations, for example in the middle of the night, crediting an account using such a method may be inconvenient or impossible.

In certain circumstances, the value of credit in a user's account can diminish to zero whilst the service is being used, thus resulting in the user being disconnected from the network so that no further use of the service can be made (until the account has sufficient credit once again).

In an attempt to avoid a user being disconnected from a network service as soon as the user runs out of sufficient credit, it is known to grant an over-draft facility of credit, typically based on credit history or as a customer loyalty reward, so that the user can finish making use of the service at their own accord.

This is not desirable for the provider of the additional credit, since they must provide a value of credit which may not be repaid.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

According to an aspect of the invention there is provided a system for crediting a user account of a pre-pay communication service. The system comprises a controller and a shared credit resource to which a plurality of users of the pre-pay service are authorized access and to which at least one user contributes credit. The shared credit resource is specifically for the purpose of storing credit to be used as payment for the provision of a communication service.

The controller is adapted to transfer credit from the shared credit resource to the user account, thereby enabling the user associated with the user account to use the pre-pay communication service.

By adapting the controller to transfer credit to the user account if the value of credit in the user account is less than or equal to a predetermined threshold value, the situation where a user is disconnected or prevented from using a service due to having insufficient credit can be avoided. Also, by adapting the controller to transfer credit to a user account in response to a request for credit, a user can make use of credit available in a shared account which is separate from the user's associated account. Such a shared account may be contributed to by an organization, for example, so as to provide a source of credit that is available for members of the organization to use.

It will be appreciated that embodiments therefore do not leave a service provider open to the risk of not being paid in return for service provision, because an additional value of credit provided to a user from the shared credit resource is provided from a source of credit that has been paid for, for example through subscription charges that contribute to the value of credit in the shared credit resource or guaranteed through a suitable agreement.

Figure 1:
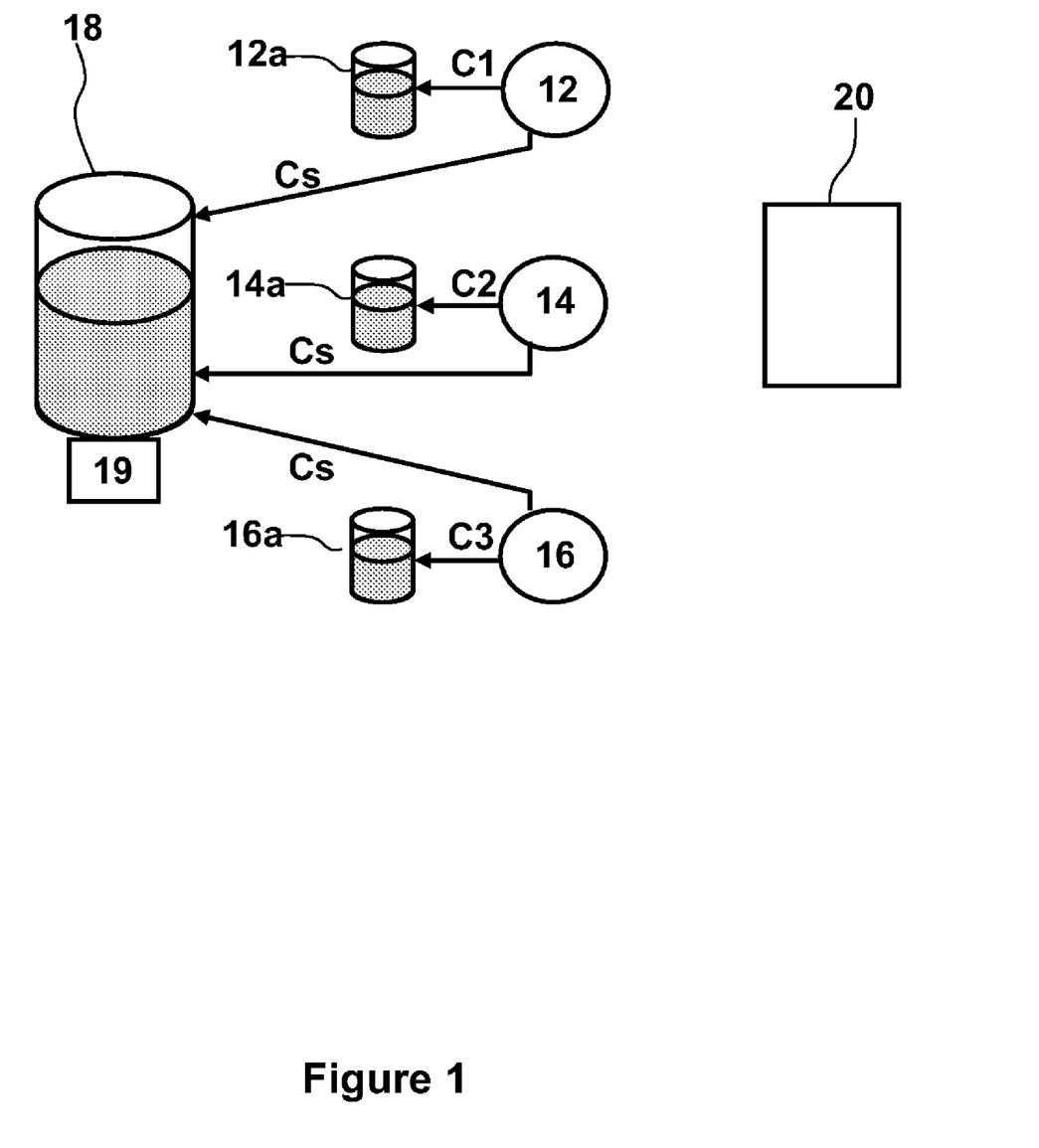
FIG. 1 illustrates an exemplary embodiment of a pre-pay system for providing communication services to first, second and third users.
Figure 2:
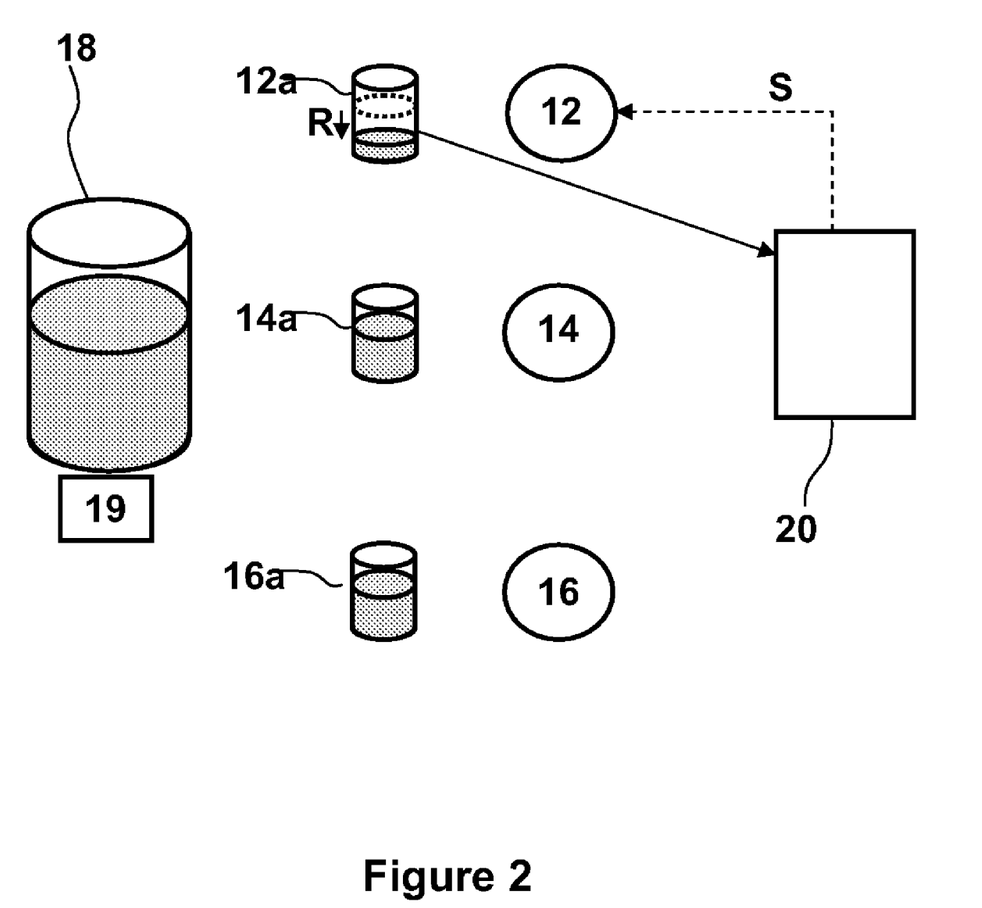
FIG. 2 illustrates the system of FIG. 1 being used to provide a communication service to a first user.
Figure 3:
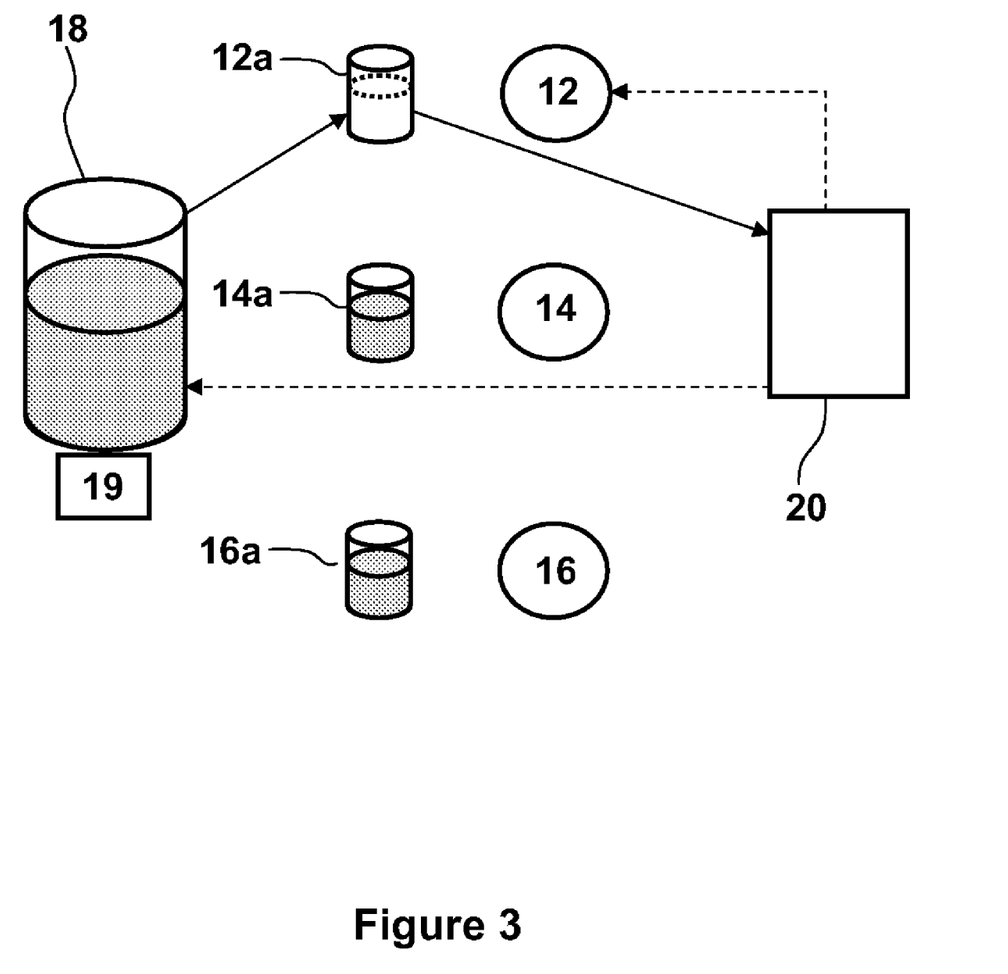
FIG. 3 illustrates the operation of the system of FIG. 1 according to an embodiment.

Referring to FIGS. 1 to 3, an exemplary embodiment of a pre-pay system 10 for providing services to first 12 to third 16 users will now be described.

Each of the first 12, second 14 and third 16 users have an associated user account for storing a value of credit. In other words, the first user 12 is associated with a first user account 12a to which the first user 12 contributes credit (as illustrated by the arrow labeled "C1" in FIG. 1) in order to make use of a service provided by the pre-pay system 10. Similarly, the second user 14 is associated with a second user account 14a to which the second user 14 contributes credit (as illustrated by the arrow labeled "C2" in FIG. 1), and the third user 16 is associated with third user account 16a to which the third user 16 contributes credit (as illustrated by the arrow labeled "C3" in FIG. 1).

The system also comprises a shared credit resource 18 to which the first 12 to third 16 users are authorized access and to which at they each contribute a value of credit (as illustrated by the arrows labeled "Cs" in FIG. 1). The shared credit resource 18 comprises a controller 19 which is adapted to transfer a value of the stored credit to any of the first to third users. In this way, a value of credit may be transferred from the shared credit resource 18 to the first user account 12a, for example, thereby increasing the value of credit in the first user account 12a.

By way of example, the shared credit resource may be implemented on a data storage medium owned and operated by the operator of the pre-pay system. It will be understood that the shared credit resource is not to be taken as a shared bank account which stores monetary value for more than one person.

A server 20 for providing services to the users of the system is adapted to stores information regarding the value of credit in each of the first 12a to third 16a user accounts and the value of credit in the shared credit resource 18. Authorization Information regarding user access rights, pass-codes and/or privileges to the shared credit resource 18 is also stored by the server 20.

Based on the stored information, the server 20 can determine whether or not a user has sufficient credit available in an associated user account to make use of a service. The server 20 can also use the stored information to determine if a user is authorized to access credit available in the shared credit resource 18. Thus, if determined appropriate, the server 20 can allow a user to utilize a value of credit available in the shared credit resource 18 in order to secure payment for the provision of a service to the user.

Referring to FIG. 2, when the server 20 provides a service to the first user 12, as illustrated by the dashed line labeled "S", credit in the first user account 12a is removed by the server 20 by way of payment for the provided service. As a result, the value of credit in the first user account 12a is reduced (as shown by arrow "R"). Removal of credit from the first account 12a continues whilst the first user 12 is provided the service for the server 20.

If the value of credit in the first user account 12a is diminished to such an extent that it runs out (i.e. reaches a value of zero), the system can be illustrated as in FIG. 3.

In FIG. 3, the value of credit in the first user account 12a is equal to zero. At such a point the server 20 determines whether or not the first user 12 is authorized to make use of the credit in the shared credit resource 18 based on the information it has regarding the first user 12 and/or the shared credit resource 18.

If it is determined that the first user 12 is not authorized to use the credit in the shared credit resource 18, the server 20 discontinues or prevents provision of the service to the first user 12. By way of example, it may be determined that the first user 12 is not authorized to use the credit in the shared credit resource 18 if the first user 12 has not previously contributed at least a predetermined value of credit to the shared credit resource 18, or if the first user 12 is no longer an authorized member of an organization which contributes to and/or manages the shared credit resource 18.

Conversely, if it is determined that the first user 12 is authorized to use the credit in the shared credit resource 18, the server 20 communicates with the controller 19 of the shared credit resource 18 to request that credit be transferred from the shared credit resource 18 to the first user account 12a. In this way, the first user account 12a is provided with credit which is then used to pay for the provision of a service to the user. By undertaking the transfer of credit from the shared credit resource 18 to the first user account 12a whilst a service is being provided to the first user 12, the system can avoid the first user 12 being disconnected or prevented from using a service until such a time that the first user 12 chooses not to use the service.

In other words, a user is able to "pull" credit from shared credit resource in order to continue and complete making use of a pre-pay service. The pulling of credit can take place during service provision, invisible to the user, for seamless continuation of the service. After terminating use of the service, the user can be notified that the shared credit resource was used, along with the value of the credit that was transferred from shared credit resource.

Figure 4:
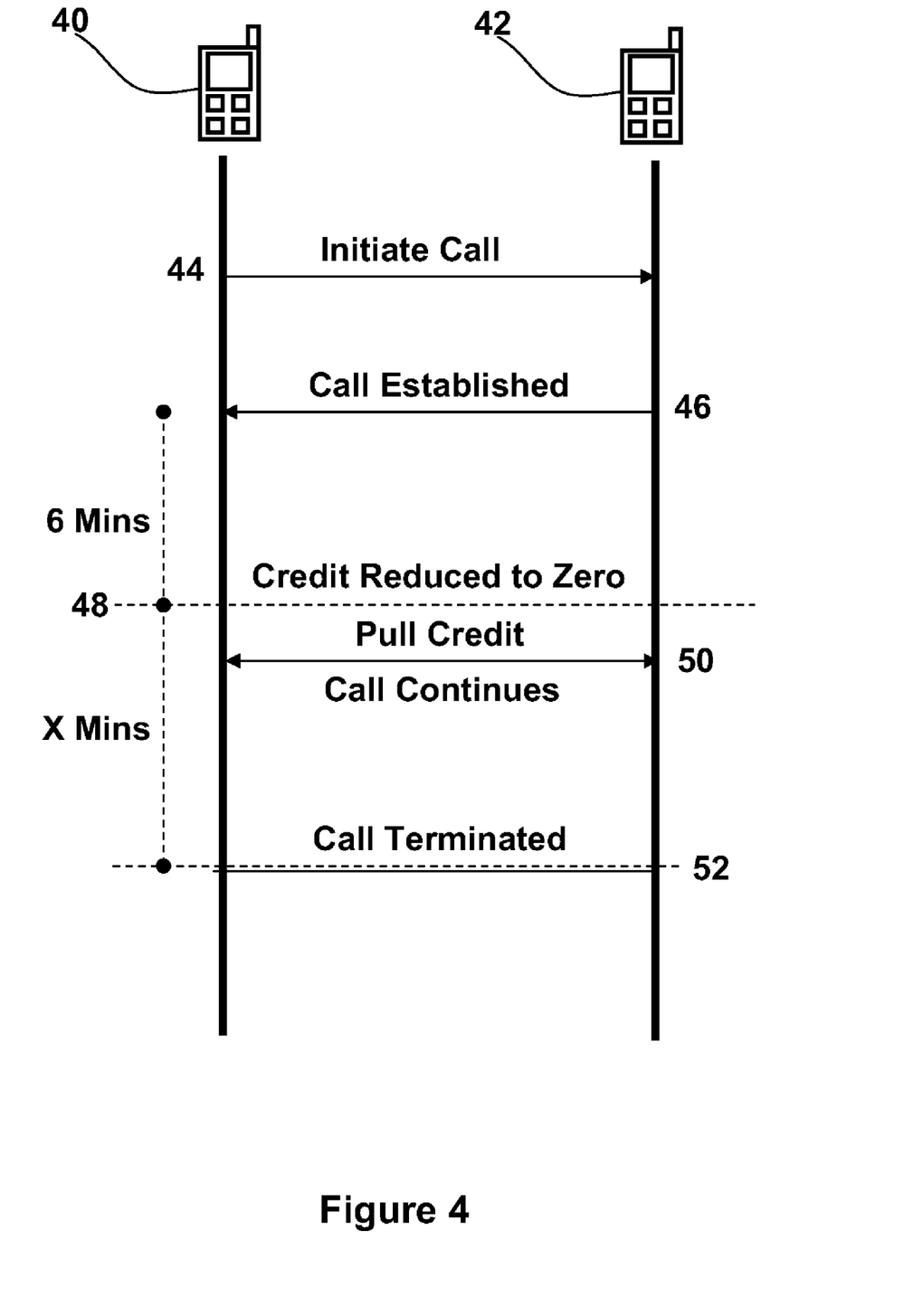
FIG. 4 is a diagram showing the processes undertaken when a user makes a phone call according to an embodiment.

Referring to FIG. 4, an embodiment will now be described in the context of mobile telephony communication services employing pre-pay billing systems. Here, a first user of a first mobile communication device 40 calls a second user of a second mobile communication device 42 via a communication network, wherein the user account of the first user has a value of credit corresponding to the cost of utilizing the communication service (i.e. making a call) for six minutes.

At step 44, the first user of the first mobile communication device 40 initiates a call to the second mobile communication device 42. The appropriate connection processes are then undertaken and a calling connection is established between the first 40 and second 42 mobile communication devices in step 46.

The first user continues the call and as the call is being maintained the value of credit in the user account of the first user diminishes. When a time period of six minutes has elapsed (at step 48), the value of credit in the user account of the first user is reduced to a value equal to zero. At this time, the credit is pulled from a shared credit resource (similar to that of FIGS. 1-3, for example) to be transferred to the user account of the first user so that the calling connection between the first 40 and second 42 mobile communication devices remains established (step 50).

The process of pulling credit from a shared credit resource in order to maintain the calling connection continues as many times as necessary until, after a further X minutes, the call is terminated by any user (step 52).

As evident from the example described above in relation to FIG. 4, a connected call does not get terminated against the user's wishes even if the value of credit in the user account runs out. Instead, the call is continued seamlessly by pulling credit from a shared credit resource that the first user is authorized to access.

Thus, the user in need of additional credit is not dependent on immediate availability of the pre-paid recharge vendors and/or vouchers. Furthermore, the user may even utilize credit available in the shared credit resource to initiate new calls and replenish the user account at a later time which is more convenient.

The amount used by the user from the shared credit resource can be transferred back to the shared credit resource when the user contributes credit to their associated user account. Replenishment of used credit from the shared credit resource can take priority over replenishment of the user account to ensure the user makes adequate contributions to the shared credit resource.

Unlike in conventional balance transfer scenarios, embodiments do not require additional systems/processes to be undertaken in order for a user to communicate the balance transfer request because the transfer of credit to the user account can be completed automatically, even while a service is being used.

Figure 5:
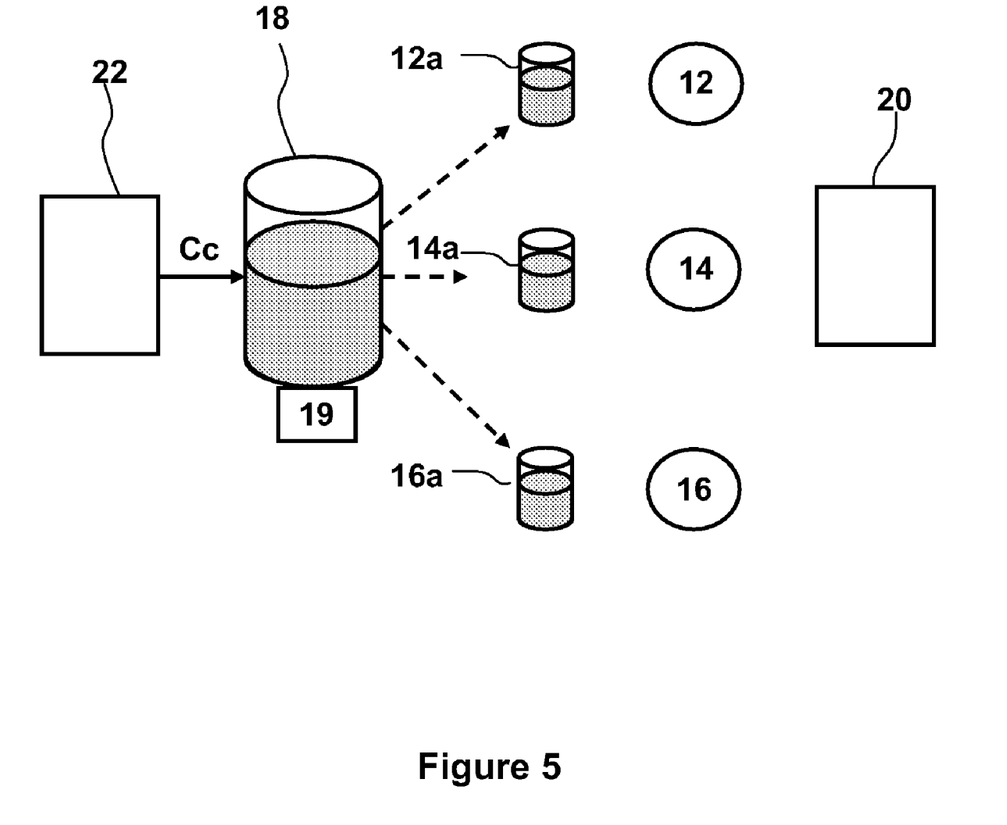
FIG. 5 shows a modification of the system of FIG. 1.

FIG. 5 illustrates an alternative embodiment in which the first 12 to third 16 users do not contribute credit to the shared credit resource 18. Instead, an organization 22, such as a company, contributes credit (as illustrated by the arrow labeled "Cc") to the shared credit resource 18. The first 12 to third 16 users are employees of the organization and authorized to make use of the credit in the shared credit resource 18 for purposes relating to organization (business calls, for example).

Figure 6:
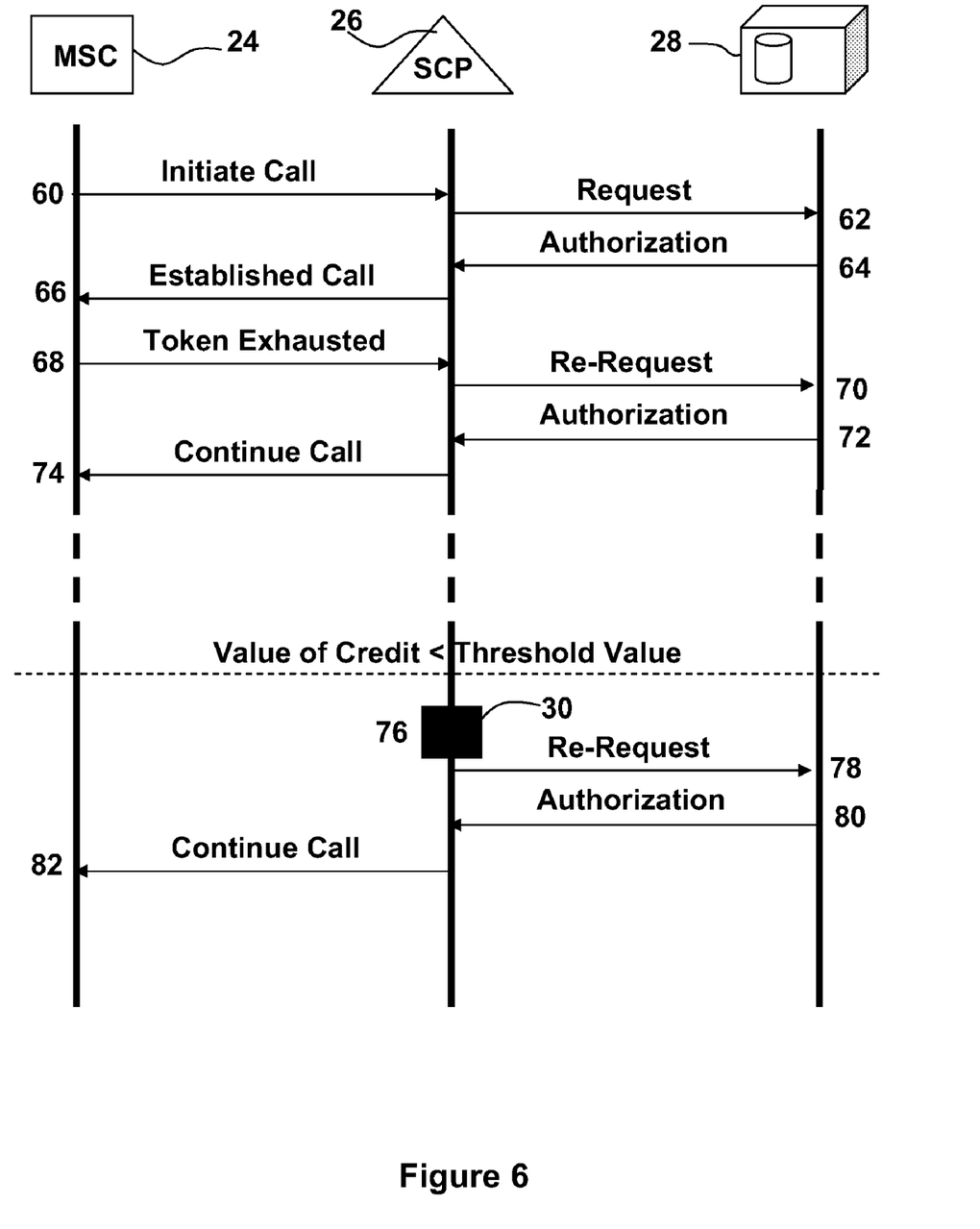
FIG. 6 is a diagram showing the processes undertaken when a user makes a phone call according to another embodiment.
Figure 7:
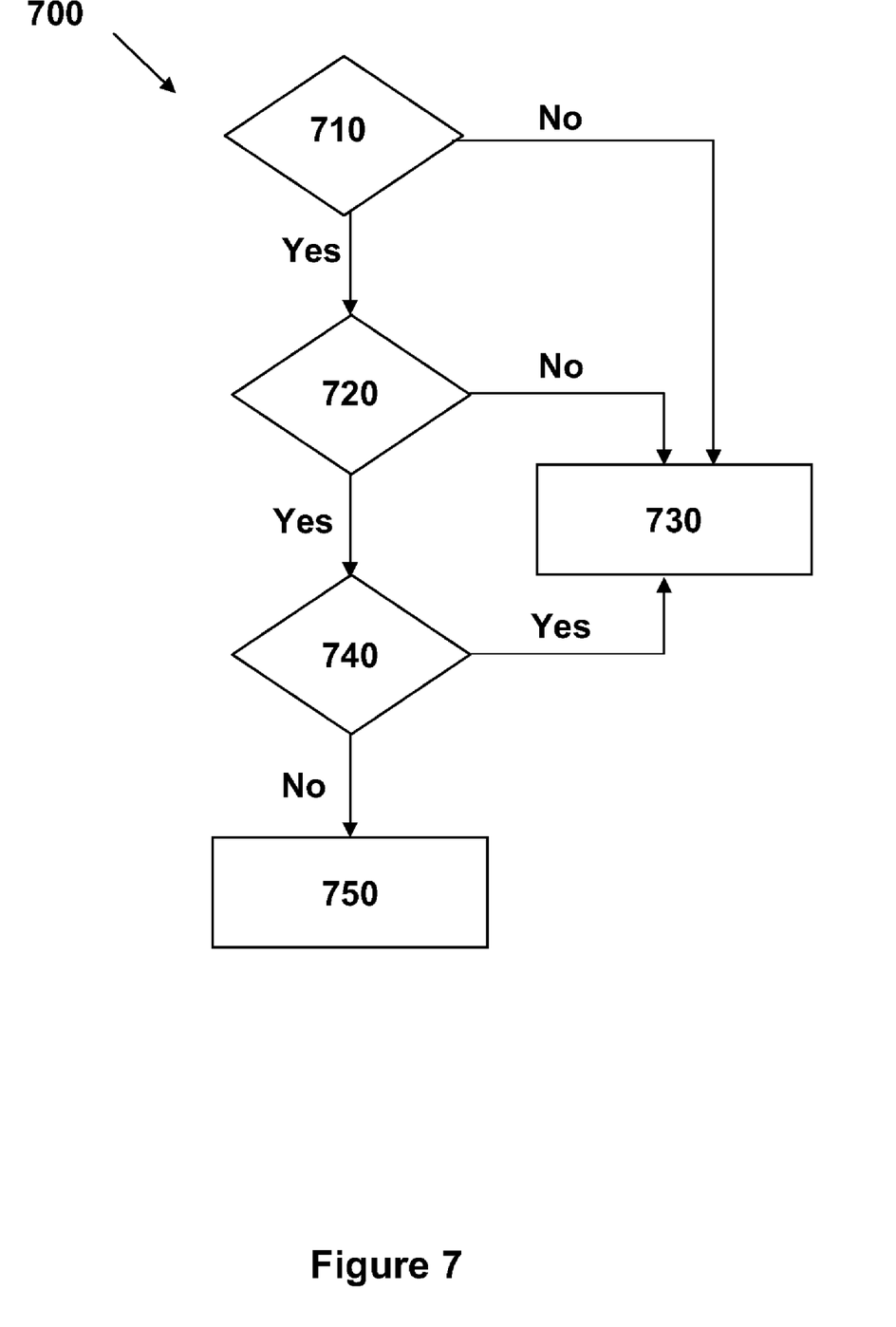
FIG. 7 is a flow diagram illustrating a method used in step 76 of FIG. 6.

FIGS. 6 and 7 will now be referred to in order to illustrate how an embodiment can be implemented using conventional mobile telephony communication hardware. Here, a first user calls a second user using a mobile communication device.

First, at step 60, the call reaches the Mobile Switching Centre (MSC) 24, which then contacts the Service Control Point (SCP) 26. As a part of call setup, the SCP 26 interrogates a billing server 28 in step 62 by sending an authorization request message to the billing server requesting information regarding the value of credit in the caller's user account.

The billing server 28 verifies the value of credit available in the caller's user account and, if a sufficient value of credit is available, sends an "authorization conf" message to the SCP 26 in the step 64. The authorization conf message confirms that the caller has a sufficient value of credit available in order for the call to be established.

In response to receiving the authorization conf message, the SCP 26 then instructs the MSC 24 to establish the call (step 66).

The caller and called user continue the call and, while the call is maintained, tokens (specified value of credit) are exhausted or used up. Each time a token is used, the MSC 24 informs the SCP 26 (step 68) and the SCP 26 sends a further authorization request message to the billing server 28 (step 70) requesting information regarding the remaining value of credit in the caller's user account. Similarly to step 64, the billing server 28 responds to an authorization request message received from the SCP 26 by verifying if there is a sufficient value of credit available, and responds by sending an authorization conf message to the SCP 26 (step 72) if a sufficient value of credit is available.

In response to receiving the authorization conf message, the SCP 26 then instructs the MSC 24 that the call can continue (step 74).

Steps 68-74 are repeated until the billing server 28 determines that the value of credit in the caller's user account is less than a predetermined threshold value. By way of example, the threshold value may represent a value of credit that is needed to pay for keeping the call connected for a predetermined period of time, such as one minute.

When it is determined that the value of credit in the caller's user account is less than the predetermined threshold value, application logic 30 undertakes the method 700 illustrated in FIG. 7 so as to determine whether the caller is able to make use of credit in a shared credit resource and to make use of such shared credit if the caller is authorized to do so (step 76).

Referring now to FIG. 7, the method 700 begins by completing the step 710 of checking whether or not the caller is a member of a shared user account. If the caller is not a member of the shared user account, the method proceeds to step 730 in which the call is ended. Conversely, if the caller is a member of a shared user account, the method continues to step 720 in which it is determined whether or not the caller is authorized access to the credit in the shared credit resource. If, in step 720, it is determined that the caller is not authorized access to the credit in the shared credit resource, the method proceeds to step 730 in which the call is ended.

If, in step 720, it is determined that the caller is authorized access to the credit in the shared credit resource, the method proceeds to step 740. In step 740, it is determined whether or not the caller has exceeded an amount of credit that is available in the shared credit resource.

If it is determined that the caller has exceeded an amount of credit that is available in the shared credit resource, the method proceeds to step 730 in which the call is ended. If, on the other hand, it is determined that the caller has not exceeded the amount of credit that is available in the shared credit resource, the method proceeds to step 750. In step 750, the call is continued with by returning to the procedures illustrated in FIG. 6, wherein the subsequent authorization requests made to the billing server relate to the shared credit resource rather than the caller's user account.

Thus, the process of requesting authorization (step 78), confirming authorization is granted to continue the call (step 80), and instructing continuation of the call (step 82) is repeated with credit being provided from the shared credit resource available to the caller.

Embodiments enhance conventional prepaid recharging concepts since a user in need of additional credit is able to pull the required amount from a pre-defined pre-paid shared credit resource. A plurality of users can subscribe to the shared credit resource. By doing so, they are entitled to use the credit in the shared resource, either when the value of credit in their personal account is zero, for example, or when they want to make use of pre-pay services using the shared account. An example of the latter case may be when the pre-paid shared credit resource is managed by an organization and the user is a member of the organization that wishes to use a service on behalf of the organization.

Embodiments enable only the value of credit required to be pulled from the shared credit resource, not the value of credit required for the duration of service usage.

From the above described embodiments, it will be appreciated that several methods for creating and managing the shared credit resource may exist. By way of example, two such methods may be as follows:

Single Administrator

A single administrator may undertake functions including: 1. Creating the shared account; 2. Managing its subscription by adding and deleting members, and by assigning and monitoring credit usage of subscribers; and 3. Monitory management of the credit available in the shared account.

No Single Administrator

When no single administrator is used, each user of the shared account may be responsible for the above mentioned tasks that may otherwise be undertaken by a single administrator. Here, each user contributes a specific amount from his/her associated user account to the shared account. When a user utilizes a value of credit from the shared account, that value of credit can be replenished in the shared account when the user next contributes credit to his/her user account. Subscription to a shared account, and the performance of functions associated with managing the shared account, can be achieved by exchanging Unstructured Supplementary Service Data (USSD) or Short Message Service (SMS) messages or by communicating with the network operator(s).

It will be appreciated that embodiments provided numerous technical advantages when compared to convention pre-pay billing approaches.

For example, a service does not get terminated when a user of the service runs out of credit in their user account.

Also, a single user can have multiple accounts and he/she can use a particular account for a particular purpose. For example, an employee can use his/her personal user account for making personal calls, but can use credit from a pre-paid shared account (contributed to by the employer) when making work-related calls.

In situations where recharging of account is not convenient or cannot be done immediately (for example, when a the user is far away from a recharge point or requires to recharge at a time when retailers are closed), a user with no or inadequate credit in their user account can still make use of services without needing to replenish the user account at that time.

Embodiments provide for a single point of management of multiple accounts. This can be very useful in corporate business segments, where all the business calls by the employees can be made and monitored using the single shared prepaid account.

Trusted circles like family and friends can be provided with a pre-paid shared account to ensure that members have access to sufficient credit at all times, and can use the shared group account when needed. For example, families can ensure that their children can contact them irrespective of the personal balance status of the child.

Embodiments enable services to be provided between different network operators without being exposed to the risk of non-payment. For example, where a second operator charges for use of their network by a first network operator, the first operator can ensure that they have previously received adequate payment for the provided services, therefore guaranteeing payment to the second operator. This results from the fact that the credit provided by the shared credit resource is paid for prior to being transferred to a user account. In conventional pre-pay systems, a network operator may be unable to offer a flexible service allowing a user to complete use of a service despite having inadequate credit, because the network operator must rely upon the user paying for the overdraft or additional service at later date. If the user then fails to make such repayments, the network operator is insufficiently reimbursed and either loses such funds or does not have the funds to pay the costs of the second operator.

While specific embodiments have been described herein for purposes of illustration, various other modifications will be apparent to a person skilled in the art and may be made without departing from the scope of the invention.

We claim:

1. A system for crediting a user account of a pre-pay communication service, the system comprising:
    a shared credit resource to which a plurality of users of the pre-pay communication service are authorized access and to which at least one user contributes credit; and
    a controller to transfer credit from the shared credit resource to the user account to enable the user associated with the user account to use the pre-pay communication service,
    wherein the shared credit resource is specifically adapted to store credit to be used as payment for the provision of a pre-pay communication service,
    wherein the controller monitors the credit available in the user account to pay for the provision of the pre-pay communication service while the user associated with the user account is accessing the pre-pay communication service, and
    wherein, based on the monitoring and while the user is accessing the pre-pay communication service, the controller automatically transfers credit from the shared credit resource to the user account in response to the value of the credit in the user account reaching or falling below a predetermined threshold value.

2. The system according to claim 1, wherein the controller transfers credit from the shared credit resource to the user account in response to a request for credit.

3. The system according to claim 1 further comprising an authentication unit to determine if a user of the pre-pay communication service is authorized to access the shared credit resource.

4. The system according to claim 1, wherein, in response to an input received from a user specifying selection of one of available credit from the user account and available credit from the shared credit resource, the controller selects the specified one of the available credit to pay for the pre-pay communication service.

5. A pre-pay system for providing a pre-pay communication service to a communication device of a user, the system comprising:
    a server to store account information comprising a value of credit; and
    a system to credit a user account of a pre-pay communication service comprising:
    a shared credit resource to which a plurality of users of the pre-pay communication service are authorized access and to which at least one user contributes credit; and
    a controller to transfer credit from the shared credit resource to the user account for the user associated with the user account to use as payment for the pre-pay communication service,
    wherein the shared credit resource is specifically adapted to store credit to be used as payment for the provision of the pre-pay communication service,
    wherein, in response to an input from a user specifying selection of one of available credit from the user account and available credit from the shared credit resource, the controller selects the specified one of the available credit to pay for the provision of the pre-pay communication service.

6. The pre-pay system according to claim 5 wherein the communication device is a mobile telephony device and the pre-pay communication service is provided via a wireless communication network.

7. The pre-pay system according to claim 5, wherein, when the user account is selected, the controller monitors the value of credit available from the user account to pay for the pre-pay communication service while the user associated with the user account is accessing the pre-pay communication service, and
    wherein, while the user is accessing the pre-pay communication service, the controller automatically transfers credit from the shared credit resource to the user account if the monitored value of the credit in the user account reaches or falls below a predetermined threshold value.

8. A method of crediting a user account of a pre-pay communication service, the method comprising:
    providing a shared credit resource to which a plurality of users of the pre-pay communication service are authorized access and to which at least one user contributes credit;
    monitoring value of the credit available in the user account to pay for the pre-pay communication service while the user associated with the user account is accessing the pre-pay communication service; and
    while the user associated with the user account is accessing the pre-pay communication service and in response to the monitored value of the credit available from the user account reaching or falling below a predetermined threshold value, transferring credit from the shared credit resource to the user account for the user associated with the user account to use for payment of the pre-pay communication service,
    wherein the shared credit resource is specifically adapted to store credit to be used as payment for the provision of a pre-pay communication service.

9. The method according to claim 8, further comprising transferring credit from the shared credit resource to the user account in response to a request for credit.

10. The method according to claim 8 further comprising determining if a user of the pre-pay communication service is authorized to access the shared credit resource.

11. The method according to claim 8, further comprising, in response to an input from a user specifying selection of one of available credit from the user account and available credit from the shared credit resource, selecting the specified one of the available credit to pay for the pre-pay communication service.

12. The method according to claim 11, further comprising automatically transferring credit from the shared credit resource to the user account when the shared credit resource is selected.

13. A computer program comprising computer program means adapted to perform, when run on a computer, the steps of:

provinding a shared credit resource to which a plurality of users of a pre-pay communication service are authorized access and to which at least one user contributes credit;

monitoring value of the credit available in the user account to pay for the pre-pay communication service while the user associated with the user account is accessing the pre-pay communication service; and in response to the monitored value reaching or falling below a predetermined threshold value and while the user associated with the user account is accessing the pre-pay communication service, transferring credit from the shared credit resource to the user account for the user associated with the user account to use as payment for the pre-pay communication service, wherein the shared credit resource is specifically adapted to store credit to be used as payment for the provision of a pre-pay communication service.

14. The computer program as claimed in claim 13 embodied on a non-transitory computer readable medium.

15. The computer program according to claim 13, further comprising: in response to an input from a user specifying selection of one of available credit from the user account and available credit from the shared credit resource, selecting the specified one of the available credit to pay for the pre-pay communication service.

* * * * *